(12) United States Patent
Tsai

(10) Patent No.: US 7,251,130 B2
(45) Date of Patent: Jul. 31, 2007

(54) COMPUTER SYSTEM WITH VERTICALLY OFFSET HARD DISK DRIVES

(75) Inventor: Chia-Lin Tsai, Taipei Hsien (TW)

(73) Assignee: Micro-Star Int'l Co., Ltd., Taipei Hsien (TW)

( * ) Notice: Subject to any disclaimer, the term of this patent is extended or adjusted under 35 U.S.C. 154(b) by 131 days.

(21) Appl. No.: 11/162,229

(22) Filed: Sep. 1, 2005

(65) Prior Publication Data

US 2007/0047194 A1    Mar. 1, 2007

(51) Int. Cl.
*H05K 5/00*    (2006.01)
(52) U.S. Cl. .................................... 361/685; 361/727
(58) Field of Classification Search ........ 361/724–727, 361/679–686; 312/223.1, 223.2
See application file for complete search history.

(56) References Cited

U.S. PATENT DOCUMENTS

| | | | |
|---|---|---|---|
| 6,400,578 B1* | 6/2002 | Chen | 361/829 |
| 6,459,571 B1* | 10/2002 | Carteau | 361/684 |
| 6,535,381 B2* | 3/2003 | Jahne et al. | 361/685 |
| 6,545,839 B2* | 4/2003 | Smith | 360/97.01 |
| 6,621,693 B1* | 9/2003 | Potter et al. | 361/685 |
| 6,754,082 B1* | 6/2004 | Ding et al. | 361/727 |
| 7,154,757 B1* | 12/2006 | Pavol et al. | 361/740 |
| 2003/0081378 A1* | 5/2003 | Debbins et al. | 361/685 |
| 2003/0147220 A1* | 8/2003 | Fairchild | 361/726 |
| 2005/0041383 A1* | 2/2005 | Lo | 361/683 |

* cited by examiner

*Primary Examiner*—Jayprakash Gandhi
*Assistant Examiner*—Anthony Q Edwards
(74) *Attorney, Agent, or Firm*—Winston Hsu

(57) ABSTRACT

A computer system with vertically offset hard disk drives has a space in one side for containing the two vertically offset hard disk drives held by a mobile rack in a vertically offset manner. The mobile rack fixes the two hard disk drives with two vertically offset screw sets. A holding frame in the space of the computer system has two vertically offset connectors that allow the two hard disk drives to be connected at the same time when the mobile rack is completely inserted into the holding frame.

9 Claims, 6 Drawing Sheets

COMPUTER SYSTEM WITH VERTICALLY OFFSET HARD DISK DRIVES

BACKGROUND OF THE INVENTION

1. Field of the Invention

The present invention relates to a computer system, and more specifically, to a computer system with vertically offset hard disk drives.

2. Description of the Prior Art

Due to the need for standardization and modularization, industry has drawn up standards that regulate specifications of network servers, including 1.75 inches as a standard height unit. A server conforming to this standard unit is called a 1U server. Because of this height regulation of servers, the heights of hard disk drives should also conform to the standard.

Prior art 1U servers can only accommodate standard 3.5-inch (width) hard disk drives since the height of the server is limited. Please refer to FIG. 1, which illustrates a prior art mobile rack with a single hard disk drive. The mobile rack carries a single hard disk drive and can be inserted into the prior art server. However, to meet the requirement of mass data processing, increasing the number of hard disk drives of a server has become an inevitable tendency, hence the 2U, 3U, and 4U server specifications to accommodate more hard disk drives have been developed. In these specifications, hard disk drives are vertically stacked inside a server. Another server design conforming to the 1U server specification has a plurality of hard disk drives installed in a juxtaposed manner. This server design includes a casing divided into four housing spaces by three partitions. Please refer to FIG. 2, which shows a design from U.S. Pat. No. 6,768,638 entitled "Server Contained Four Juxtaposed Hard Disk Drives" that improves the features of the partitions and uses a novel retrieval cradle such that the server can accommodate four juxtaposed hard disk drives in an inherent inner width of 17 inches. However, this design merely laterally improves the space utilization of a server by reducing the space needed by the partitions, contributing little improvement to overall space utilization.

A similar problem exists in notebook computers. To meet the requirement of portability, a notebook computer has similar restrictions as the above-described servers regarding space for a hard drive. The prior art notebook has space only for a single micro hard drive, which means there is room for improvement in notebook space utilization.

SUMMARY OF THE INVENTION

Therefore, the primary objective of the claimed invention is to provide a computer system with vertically offset hard disk drives to solve the above problem.

The claimed invention provides a computer system comprising a housing; a holding frame installed inside the housing, the holding frame comprising two connectors; a mobile rack installed on the holding frame; a first hard disk drive installed in the mobile rack having a connector mounted at a rear end of the first hard disk drive; and a second hard disk drive installed in the mobile rack having a connector mounted at a rear end of the second hard disk drive, a first portion of the rear end of the first hard disk drive facing a front end of the second hard disk drive, a second portion of the rear end of the first hard disk drive having the connector not facing the front end of the second hard disk drive.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
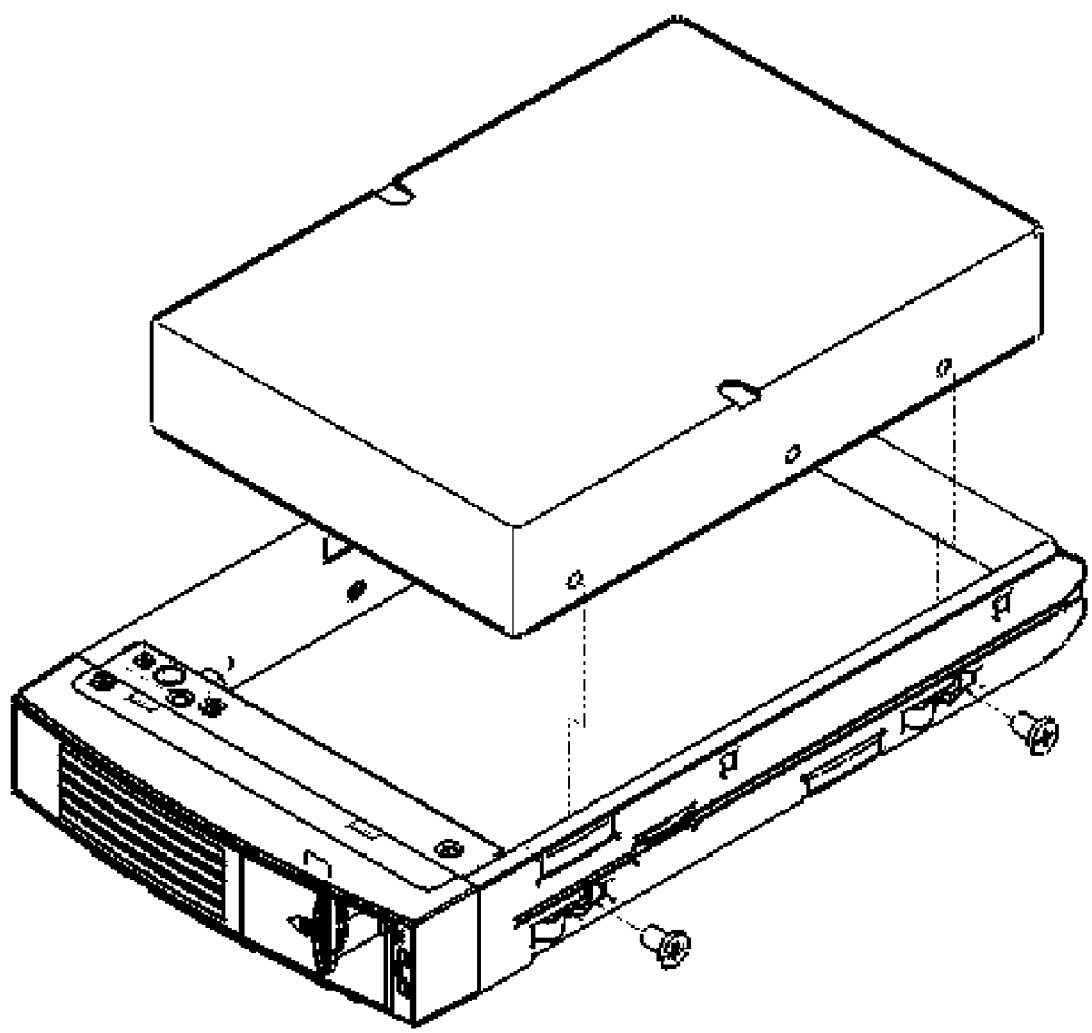
FIG. 1 is an illustration of a prior art mobile rack with single hard disk drive.
Figure 2:
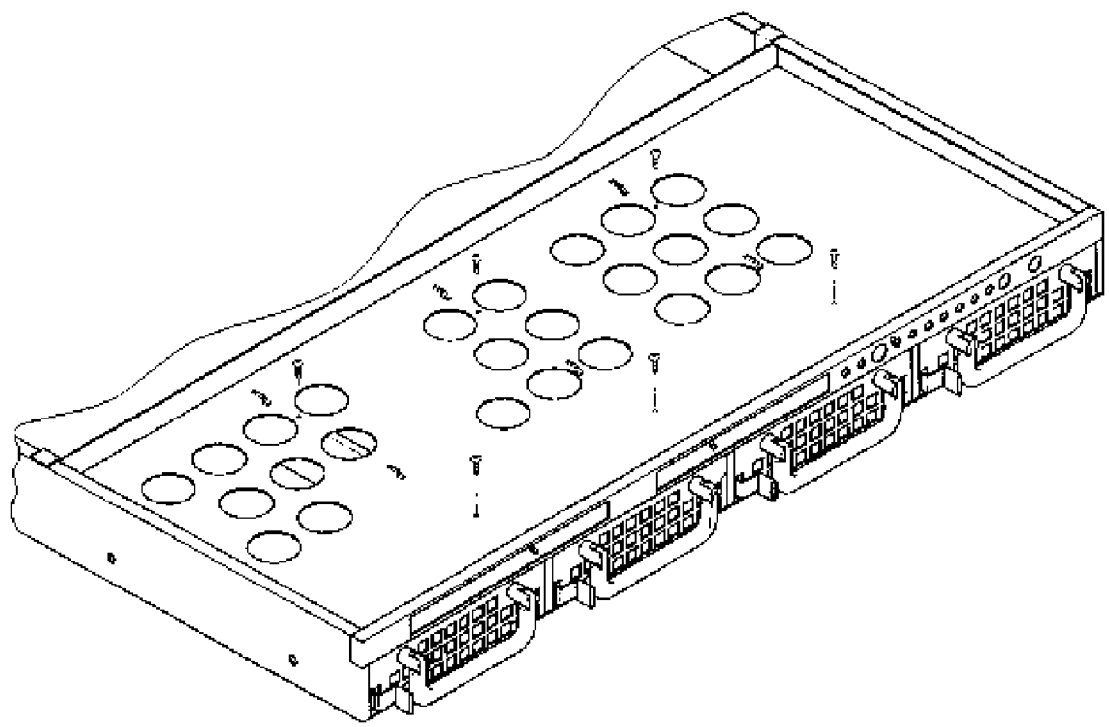
FIG. 2 is an illustration of a prior art server with juxtaposed hard disk drives.
Figure 3:
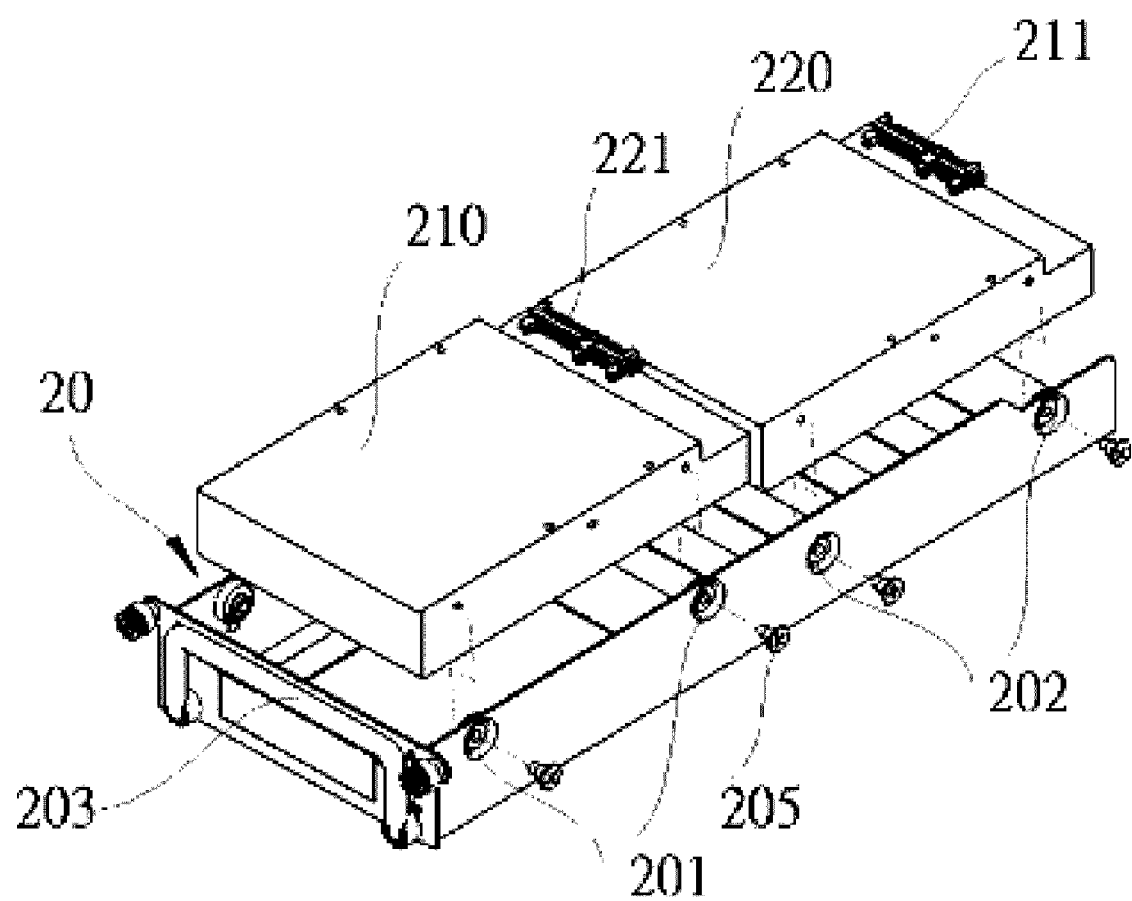
FIG. 3 is an illustration of a present invention exemplary embodiment.

Please refer to FIG. 3, which is an illustration of a present invention exemplary embodiment. The mobile rack 20 is a rectangular box-like structure that has a handle 203 installed at a front end for plugging the mobile rack 20 into a computer system or unplugging the mobile rack 20 from the computer system. Two screw sets 201, 202 are set up at each side of the mobile rack 20, wherein the second screw set 202 is positioned higher than the first screw set 201, which creates a height difference that allows the two hard disk drives 210, 220 to be installed in the mobile rack 20 at different heights. When installing the hard disk drives 210, 220, the two sides of the first hard disk drive 210 are corresponding to the first screw set 201 and are fixed by screws 205, and the two sides of the second hard disk drive 220 are corresponding to the second screw set 202 and are fixed by screws 205, thereby generating a height difference between the position of the first hard disk drive 210 and the position of the second hard disk drive 220. The total height from the top of the first hard disk drive 210 to the bottom of the second hard disk drive 220 is shorter than the height of a 1U standard computer system so that such a computer system can accommodate the two hard disk drives 210, 220.

Figure 4:
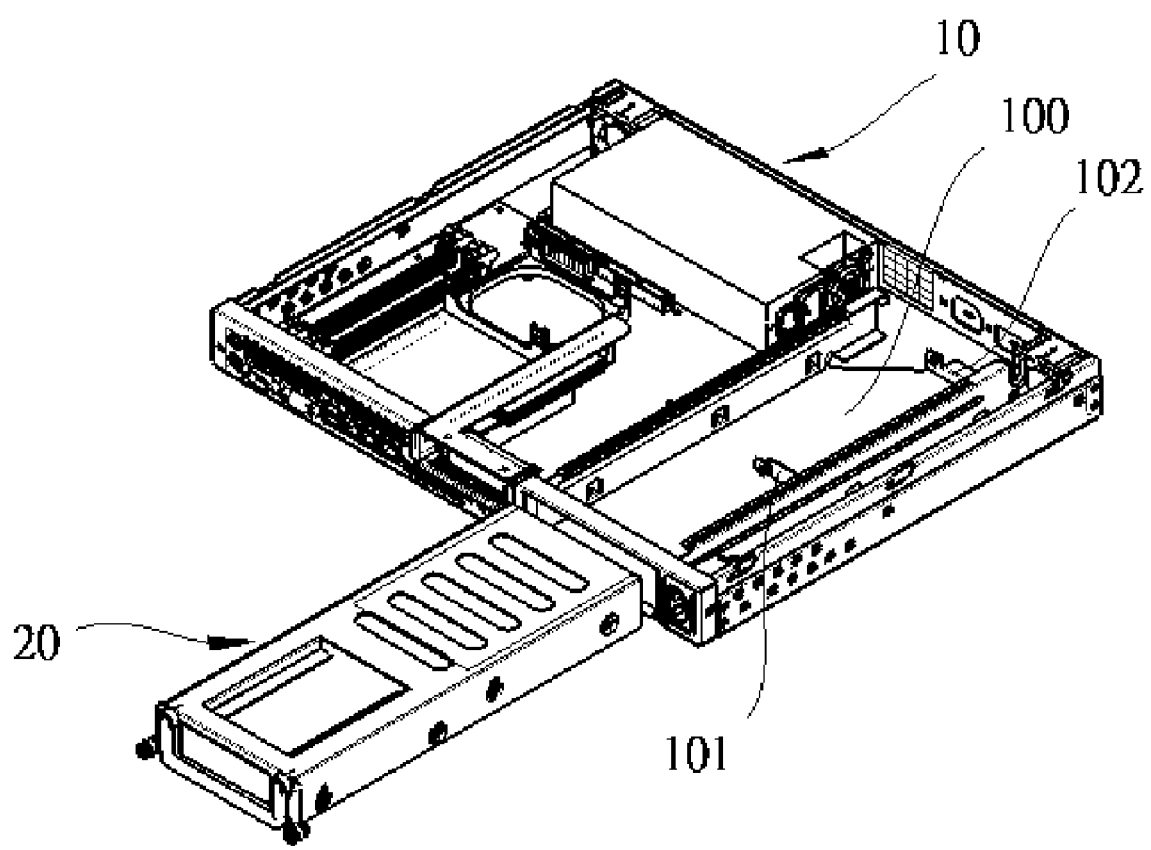
FIG. 4 is an illustration of a present invention computer system and mobile rack assembled with hard disk drives.

Please refer to FIG. 4, which illustrates a present invention computer system 10 and the mobile rack 20 with hard disk drives assembled. A space 100 for containing the mobile rack 20 is reserved in one side of the computer system 10, wherein the space 100 has a holding frame 103. A first connector 101 and a second connector 102 are installed at the bottom of the holding frame 103, wherein the second connector 102 is disposed higher than the first connector 101. The height difference between the first connector 101 and the second connector 102 is the same as the height difference between the bottom of the first hard disk drive 210 and the bottom of the second hard disk drive 220. The first connector 101 and the second connector 102 are for respective electrical connection to a first connector 211 of the first hard disk drive 210 and a second connector 221 of the second hard disk drive 220.

Figure 5:
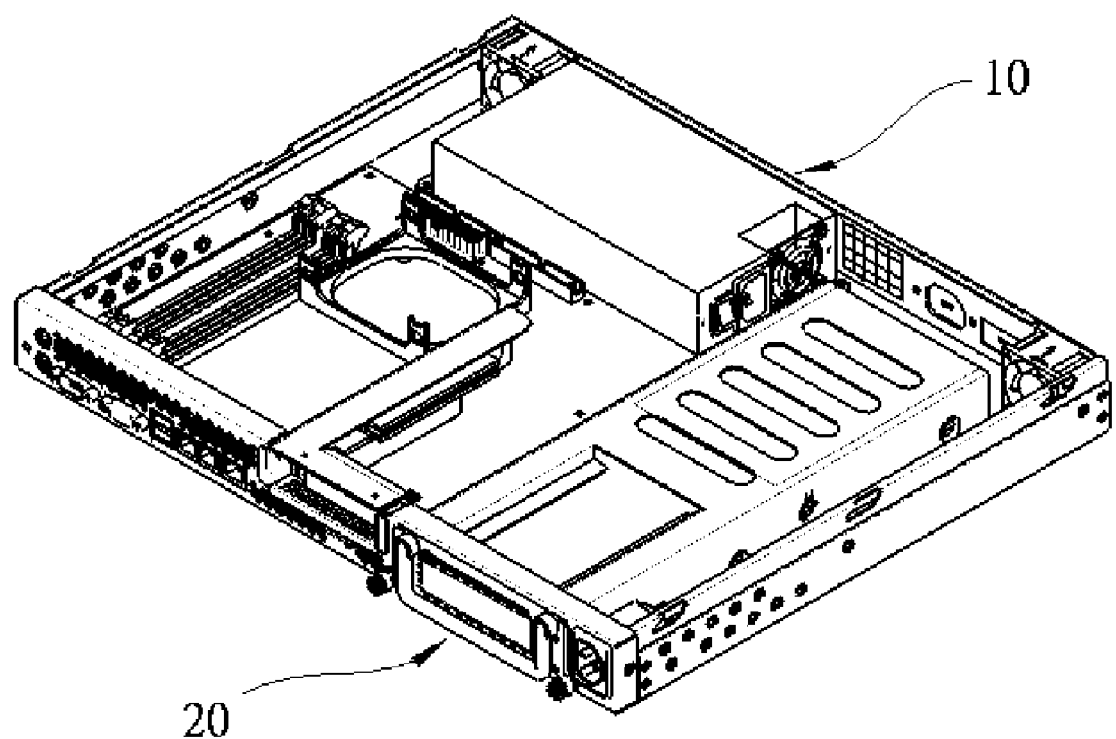
FIG. 5 is an illustration of the present invention computer system assembled with the mobile rack.

Please refer to FIG. 5, which is an illustration of the present invention computer system 10 assembled with the mobile rack 20. First, the first hard disk drive 210 and the second hard disk drive 220 are installed in the mobile rack 20. Then, the mobile rack 20 is inserted into the holding frame 103 of the computer system 20. When the mobile rack 20 is completely inserted into the holding frame 103, the first hard disk drive 210 and the second hard disk drive 220 then respectively connect to the first connector 101 and the second connector 102.

Figure 6:
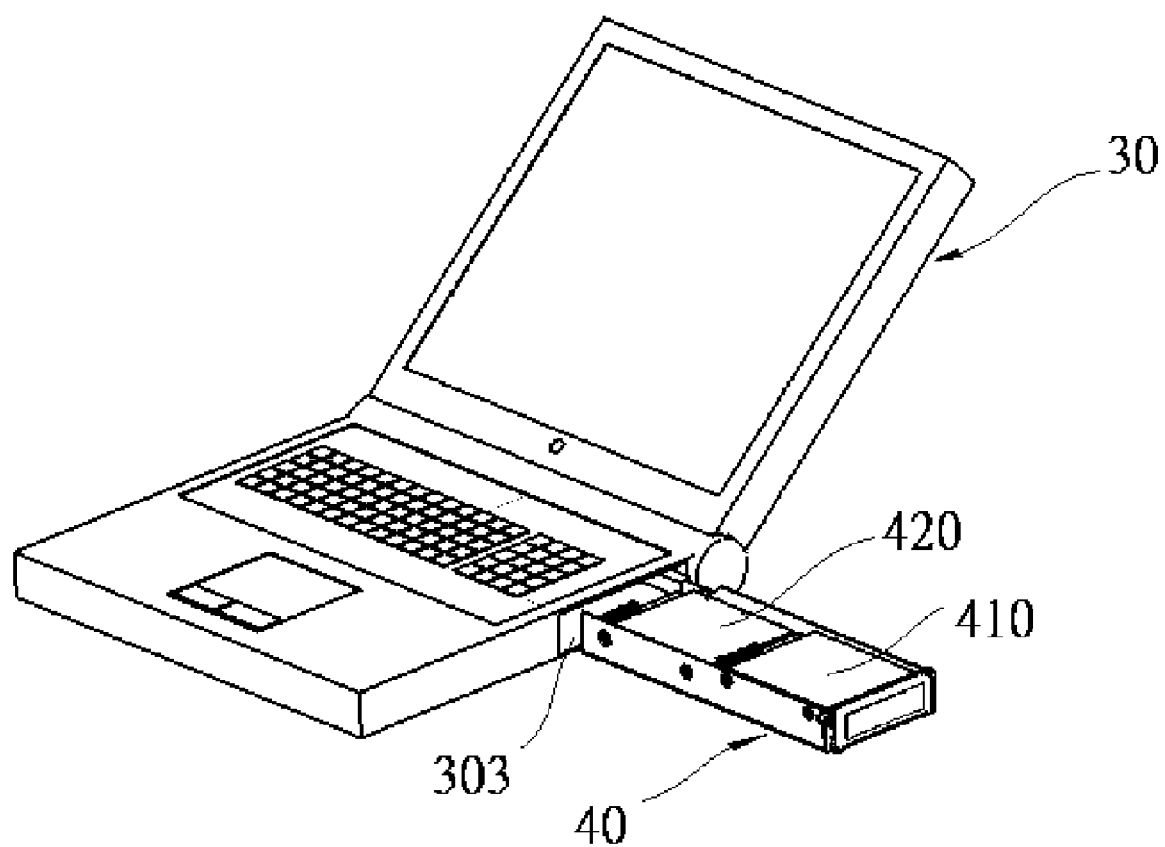
FIG. 6 is an illustration of a present invention notebook computer.

Please refer to FIG. 6, which is an illustration of an exemplary embodiment of a present invention notebook computer 30. The exemplary embodiment in FIG. 6 uses micro drives instead of 3.5-inch hard disk drives. A space with an opening at one side of the notebook 30 is for containing a micro drive mobile rack 40, which can hold two micro drives, i.e. a first micro drive 410 and a second micro drive 420. The total height from the top of the first micro drive 410 to the bottom of the second micro drive 420 is shorter than the height (thickness) of the notebook computer 30. The height difference between the first micro drive 410 and the second micro drive 420 is the same as the height difference between two corresponding micro drive connectors inside the notebook computer 30. When the micro drive mobile rack 40 is completely inserted into a holding frame 303 of the notebook computer 30, the first micro drive 410 and the second micro drive 420 of the micro drive mobile rack 40 then respectively connect to the two connectors (not shown in the figure) for subsequent mass data storage and processing.

The present invention makes more use of the inherent space of a computer system, and particularly allows a 1U standard server to contain more hard disk drives. In addition, the present invention increases the hard disk drive expandability of a notebook computer. The one-step insertion allows a plurality of hard disk drives to plug into the computer system simultaneously. More space of a computer system is saved for other peripherals, increasing the quality, functionality, and marketability of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system comprising:
   a housing;
   a holding frame installed inside the housing, the holding frame comprising a first connector and a second connector;
   a mobile rack installed on the holding frame;
   a first hard disk drive installed in the mobile rack having a third connector mounted on a rear end of a lower surface of the first hard disk drive; and
   a second hard disk drive installed in the mobile rack having a fourth connector mounted on a rear end of a lower surface of the second hard disk drive, a rear surface of the first hard disk drive facing a front surface of the second hard disk drive, the lower surface of the first hard disk drive not facing the front surface of the second hard disk drive.

2. The computer system of claim 1 wherein a height difference between the lower surface of the first hard disk drive and the lower surface of the second hard disk drive is the same as a height difference between the first and second connectors of the holding frame.

3. The computer system of claim 1 wherein the mobile rack has a handle installed at a front end of the mobile rack.

4. The computer system of claim 1 being a server.

5. The computer system of claim 1 being a 1 U standard computer system.

6. The computer system of claim 1 wherein the hard disk drives are 3.5-inch hard disk drives.

7. The computer system of claim 1 being a notebook.

8. The computer system of claim 1 wherein the hard disk drives are micro drives.

9. The computer system of claim 2 wherein the height difference is greater than zero.

* * * * *